US006830218B2

(12) United States Patent
Kordel et al.

(10) Patent No.: US 6,830,218 B2
(45) Date of Patent: Dec. 14, 2004

(54) STRUCTURAL ATTACH METHOD FOR THIN FAIRINGS

(75) Inventors: Jan A. Kordel, Redmond, WA (US); Richard B. Tanner, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/334,452

(22) Filed: Dec. 31, 2002

(65) Prior Publication Data

US 2004/0124311 A1 Jul. 1, 2004

(51) Int. Cl.⁷ .................................................. B64C 3/26
(52) U.S. Cl. ........................ 244/132; 244/124; 244/131; 403/381
(58) Field of Search ................................ 244/131, 132, 244/129.1, 123, 124; 403/3, 353, 381

(56) References Cited

U.S. PATENT DOCUMENTS

| | | | | |
|---|---|---|---|---|
| 2,088,320 A | * | 7/1937 | Vries | 403/9 |
| 3,004,645 A | * | 10/1961 | Moul, Jr. | 244/131 |
| 5,193,244 A | * | 3/1993 | Meyers | 15/235.4 |
| 6,174,102 B1 | * | 1/2001 | Do et al. | 403/381 |
| 6,224,339 B1 | * | 5/2001 | Rhodes et al. | 416/224 |
| 6,505,794 B2 | * | 1/2003 | Myers et al. | 244/158 A |
| 2001/0010779 A1 | * | 8/2001 | Pfister | 403/381 |

* cited by examiner

Primary Examiner—Michael J. Carone
Assistant Examiner—Gabriel Sukman
(74) Attorney, Agent, or Firm—Black Lowe & Graham, PLLC; Dale C. Barr (57) ABSTRACT

A method, system, and apparatus for attaching a fairing to a body or aircraft wing are disclosed. A plurality of attach anchors is disposed on the body or aircraft wing to which the fairing is to be attached. Disposed in the fairing is a plurality of core pockets that are alignable with the plurality of attach anchors, and each of the core pockets defines a channel. The fairing is placed over the body or the aircraft wing such that the heads of the attach anchors are received in the core pockets. The fairing is then slid across the body or the aircraft wing with the channels sliding along the heads of the attach anchors such that the fairing is prevented from being lifted away from the body or aircraft wing.

50 Claims, 5 Drawing Sheets

FIGURE 5

STRUCTURAL ATTACH METHOD FOR THIN FAIRINGS

FIELD OF THE INVENTION

This invention relates generally to structural attachment and, more specifically, to structural attachment of fairings.

BACKGROUND OF THE INVENTION

Ongoing research into aircraft design from time to time may discover improved wing contour designs to improve aircraft performance. Even subtle changes in wing contours may, for example, improve lift-to-drag ratios. Such improvements in lift-to-drag ratios can result in greater aircraft lift capacity or improved fuel economy per unit cargo weight. Certainly, future aircraft can benefit greatly from these enhancements.

Although future aircraft will benefit from such improvements, it would be advantageous to be able to incorporate these design changes in aircraft currently in service. Currently used aircraft have useful lives measured in decades, and such durable assets certainly represent an appreciable investment which owners would like to be able to upgrade. Accordingly, it would be advantageous to incorporate improved wing designs in currently deployed commercial or military aircraft.

Unfortunately, changing wing contours on currently in-service aircraft presents a considerable challenge. Wings on aircraft must be intricately interconnected with their aircraft to allow for flight deck controls to be connected to the many control surfaces that constitute part of the wings. Moreover, other aircraft systems, such as fuel tanks, are integrated into the wings. As a result, it is not very feasible to remove an aircraft wing and replace it with a new and improved wing. On the other hand, wing contours of existing aircraft can be modified in place by applying fairings to a surface of the wing. In particular, a contour of an upper wing surface can be changed by affixing a convex fairing to the upper wing surface.

Problems remain, however, in how to accomplish the attachment of fairings to such wing surfaces practicably, cost effectively, and durably. For example, mounting a fairing to a hollow aircraft wing housing a fuel tank presents all of the above problems. The fairing would have to be anchored to structural members within the wing such as stringers to be durable. At the same time, the fairing has to be attached without puncturing the fuel tanks inside the wing. Drilling or otherwise driving an attachment device through the fairing and into the wing, engaging the stringers, and not puncturing the tank presents a formidable problem. The problem becomes especially daunting if it is to be accomplished cost effectively within a reasonable amount of time and without incurring wasted expenses for repairing damaged wing supports or resealing punctured fuel tanks.

Thus, there is an unmet need in the art for attaching a fairing to an aircraft wing with a method that is durable, cost effective, and practicable to allow in-service aircraft to benefit from improvements in wing contour design.

SUMMARY OF THE INVENTION

The present invention provides a practical method for attaching a fairing to a body. The method allows for attach anchors to be inserted into the wing directly, optionally using existing securing orifices used to secure a body surface to the supporting structure of the body. Using existing securing orifices allows the attach anchors to be installed without meticulously drilling of the fairing and the surface of the body in order to connect with a structural member while not puncturing a tank. The fairing can then be mounted over the attach anchors, slid into place, and locked in position, achieving a practical and durable connection of the fairing to the wing.

An exemplary embodiment of the present invention provides a method for attaching a fairing to a body or aircraft wing. A plurality of attach anchors is disposed on the body or aircraft wing to which the fairing is to be attached. Disposed in the fairing is a plurality of core pockets that are alignable with the plurality of attach anchors, and each of the core pockets defines a channel. The fairing is placed over the body or the aircraft wing such that heads of the attach anchors are received in the core pockets. The fairing is then slid across the body or the aircraft wing with the channels sliding along the heads of the attach anchors such that the fairing is prevented from being lifted away from the body or aircraft wing.

Embodiments of the present invention may employ attach anchors shaped to match an inner cross-sectional shape of the channels of the core pockets in the fairing. An attach anchor may be a one piece assembly. Alternatively, an attach anchor may include an interlocking fitting at the head of the attach anchor, where the interlocking fitting is shaped to engage the channel. The interlocking fitting then is secured to the body wing surface with a securing pin mounted through the interlocking fitting. The interlocking fitting may be engaged by the securing pin through a bushing having an eccentric opening, thereby allowing the interlocking fitting to be aligned to match positions of the core pockets in the fairing. The attach anchors may include securing orifices so that locking members can be inserted through the fairing into the securing orifices once the fairing is in place to lock the fairing in position. As desired, a transitioning member can be applied over such a fairing to seal any gaps around the fairing. Embodiments may be used with any bodies that can benefit from a changed shape, including aircraft wings, aircraft bodies, or other shapes as desired for a particular application.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
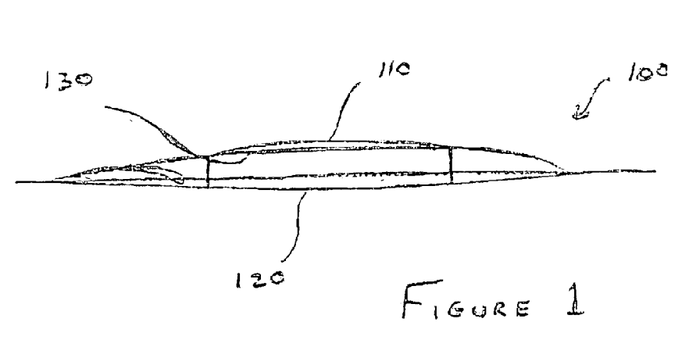
FIG. 1 is a cross-sectional view of an aircraft wing with a fairing.

FIG. 1 shows a cross-sectional view of an aircraft wing 100 with a fairing 110 attached to the wing 100. The wing 100 has a lower surface 120 and an upper surface 130 to which the fairing 110 is attached. As can be appreciated from FIG. 1, the attachment of the fairing 110 changes a contour of the wing 100 from that which was defined at the upper surface 130 of the wing by the original contour of the wing 100 to the contour now incorporating the fairing 110. Embodiments of the present invention permit such attachment in a practical manner. It will be appreciated that applicability of embodiments of the present invention is not limited to aircraft wings. For one nonlimiting example, with aeronautic lifting body designs, a fairing might suitably be attached to a main body of an aircraft. For another nonlimiting example, a fairing might suitably be attached to a hull of a marine vessel to adjust fluid dynamic properties of water passing across the hull.

Figure 2A:
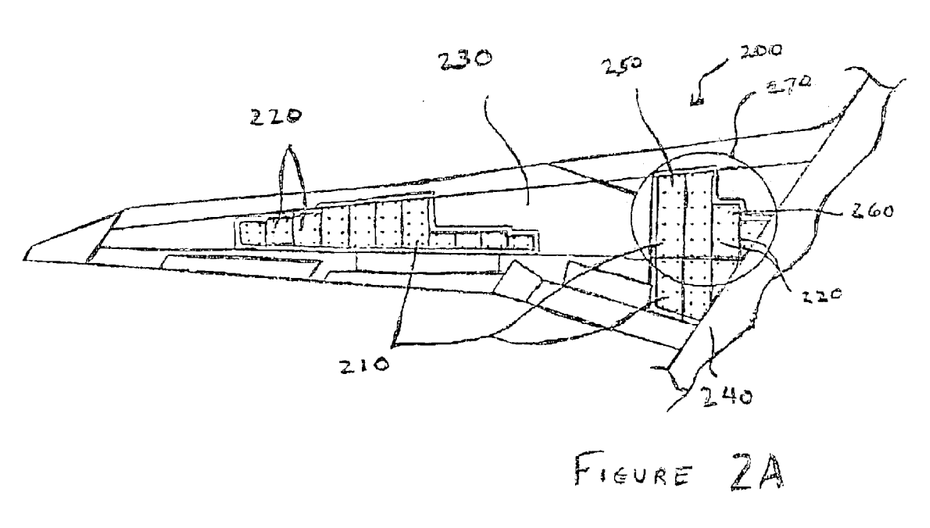
FIG. 2A is a top view of an aircraft wing with a plurality of fairing panels.

FIG. 2A shows a top view of an aircraft wing 200 with a plurality of fairing panels 210 mounted thereon using an exemplary embodiment of the present invention. As will be further described, the fairing panels 210 each are mounted to a plurality of attach anchors 220 installed on the surface 230 of the wing 200. As also will be further explained, the attach anchors 220 are directly mounted onto the surface 230 of the wing 200 and the fairing panels 210 are then attached to the attach anchors 220. FIG. 2A shows that the fairing panels 210 can be applied to parts of the surface 230 of the wing 200 both near a fuselage 240 of an aircraft and away from the fuselage 240. FIG. 2A also shows how a long fairing panel 250 can be applied completely across a length of the surface 230 of the wing 200. FIG. 2A also shows how a short fairing panel 260 may be applied across only a part of a length of the surface 230 of the wing 200. Wing contour improvements and an original wing contour appropriately dictate a shape, size, and contour of the fairing panels 210. The circled area 270 is enlarged in FIG. 2B to better show how the fairing panels 210 are joined to the surface 230 of the wing 200.

Figure 2B:
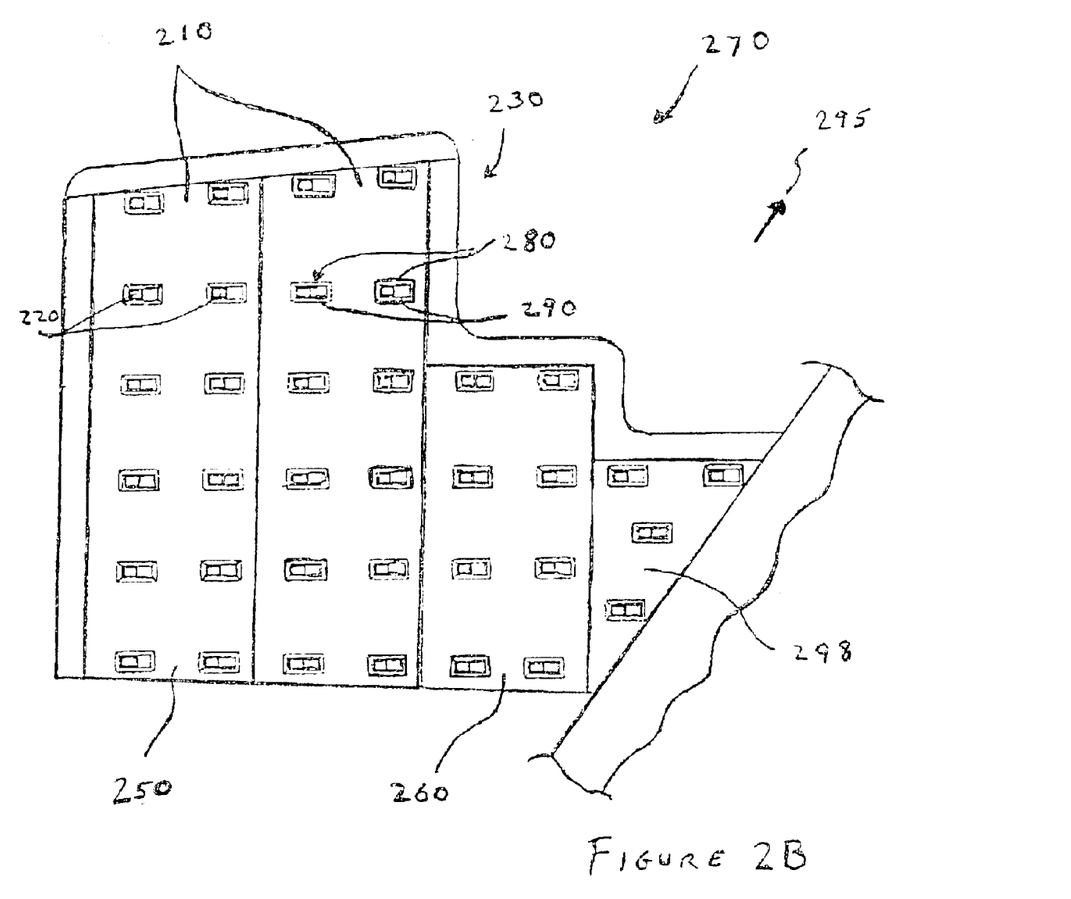
FIG. 2B is an enlarged view of a plurality of the fairing panels of FIG. 2A.

FIG. 2B shows in more detail how the fairing panels 210 are secured to the wing surface 230 in one presently preferred embodiment. FIG. 2B shows that the attach anchors 220 are received in core pockets 280 in the fairing panels 210. FIG. 2B shows one presently preferred embodiment of the invention in which the core pockets 280 incorporate an angled channel 290. The angled channel 290 is disposed approximately perpendicular to a direction 295 in which the aircraft will travel. The sides of the angled channel 290 describe a width which narrows toward an underside (not shown) of the fairing panels 210 to securely engage the attach anchors 220, which will be shown in more detail in FIG. 3A. The fairing panels 210 are installed by positioning the core pockets 280 over the attach anchors and sliding the fairing panels 210 toward the fuselage 240 to secure the fairing panels in place. In such a presently preferred embodiment, forces on the fairing panels 210 caused by airflow over the wing surface 230 from travel are approximately perpendicular to the angled channel 290 of the core pockets 280. Thus, forces caused by the airflow on the fairing panels 210 advantageously do not strain the attach anchors 220 or the core pockets 280 along the direction in which the fairing panels are slidably installed on the wing surface 230. It will also be appreciated from FIG. 2B that the fairing panels 210 can be shaped in a number of ways to effect a new wing contour across the wing surface 230. For example, the fairing panels 210 include a fairing a long fairing panel 250, a short fairing panel 260, and an angled fairing panel 298. Embodiments of the present invention do not restrict the shape of the fairing panels 210 that can be used.

Figure 3A:
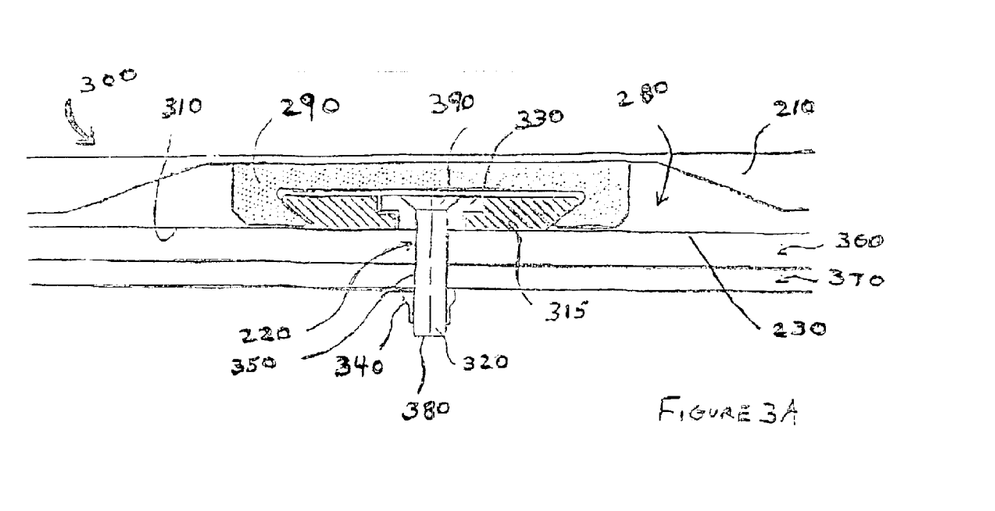
FIG. 3A is a cross-sectional view across a channel of one of the fairing panels.
Figure 3B:
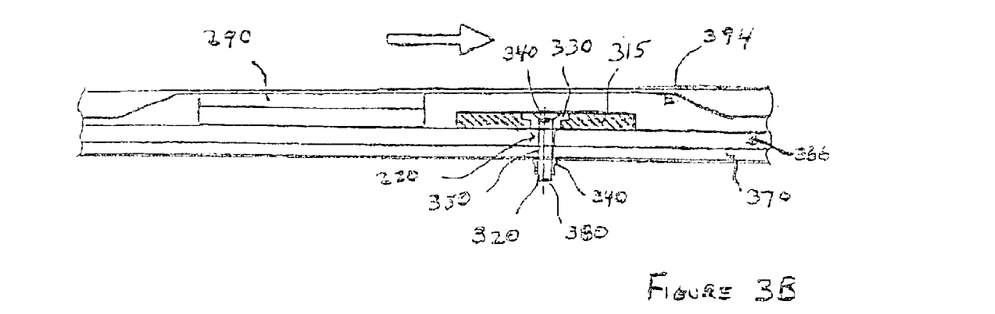
FIG. 3B is another cross-sectional view from a perspective rotated ninety degrees from that of FIG. 3A along the channel of one of the fairing panels prior to engagement of the fairing panel.
Figure 3C:
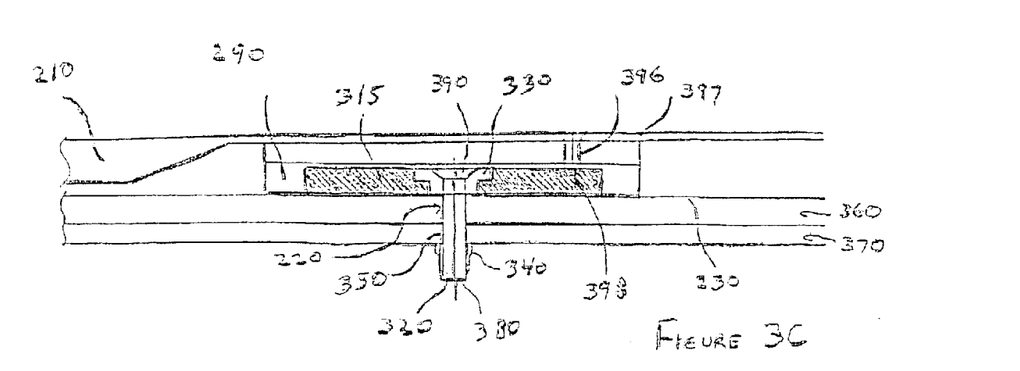
FIG. 3C is another cross-sectional view along the channel of one of the fairing panels with the fairing secured in place.

FIGS. 3A, 3B, and 3C show in more detail how the attach anchors 220 engage the core pockets 280 to attach a fairing panel 210 to a wing surface 230. FIG. 3A shows an enlarged cross-sectional view of the fairing panel 210 looking across the angled channel 290 of one of the core pockets 280 of a fairing panel 210. More specifically, FIG. 3A shows the attach anchor 220 engaging the angled channel 290 of one of the core pockets 280 in an installed position.

In one presently preferred embodiment, the fairing panel 210 itself is suitably a composite, honeycomb-stiffened panel having pockets of a solid material around attachment points 300 such as that shown in FIG. 3A. Such a panel is advantageously lighter in weight than a panel made entirely of a solid material of sufficient sturdiness to withstand forces applied to the fairing panel 210 about such an attachment point. The angled channel 290 is fitted within the core pocket 280. As previously described in connection with FIG. 2B, the angled sides narrow toward an underside 310 of the fairing panel 210 with the underside 310 of the fairing panel 210 facing the wing surface 230. Inward-facing sides of the angled channel 290 thereby securely engage outward-facing sides of the attach anchor 220.

More specifically, in the embodiment shown in FIG. 3A, the attach anchor 220 has four parts: an interlocking fitting 315, a cylindrical fastener 320, a bushing 330, and a self-sealing collar 340. In one presently preferred embodiment, the interlocking fitting 315 is shaped to substantially match an inner cross-section of the angled channel 290 to effect a secure fit between the attach anchor 220 and the core pocket 280. The interlocking fitting 315 receives the bushing 330 which, in turn, receives the cylindrical fastener 320. The interlocking fitting 315 suitably is formed to receive an off-the-shelf bushing 330, and the bushing 330 may include an eccentric or slotted opening through which the fastener 320 is received or have an undersized outside diameter relative to an opening in the interlocking fitting 315 the bushing 330 will engage. The eccentric, slotted, or undersized diameter opening in the bushing 330 allows the interlocking fitting 315 to be adjusted in position to align with a respective core pocket 280 in the fairing, and then to be substantially secured to the surface with the fastener 320.

In one presently preferred embodiment, the interlocking fittings 315 would be aligned by creating a template of positions of the core pockets 280 in a respective fairing panel 210. The template is placed over the body or wing surface to which the fairing panel 210 will be mounted, and provide a guide through which the attach anchors 220 are installed and aligned to receive the core pockets 280. Once aligned, the fasteners 320 can be tightened to their fully installed position and thereby secure the interlocking fittings 315 in place to ultimately securely hold the fairing panel 210 in place.

The fastener 320, once installed through the bushing 320 and the interlocking fitting 315 is capped with the self-sealing collar 340. The fastener 320 in one presently preferred embodiment is received in an existing fastener orifice 350 in the wing surface 230, thereby replacing an ordinary fastener used to secure a wing surface material 360 to a stringer 370 or other structural member that supports the wing surface 230. The self-sealing collar 340 disposed on a wing-facing, inside end 380 of the fastener 320. Once installed, the collar 340 seals against the stringer 370. Accordingly, if the attach anchor 220 is installed through a portion of the wing surface 230 that includes a fuel or other tank, inserting the attach anchor 220 advantageously does not create an opening in the tank. It will also be appreciated that, when a stringer 370 extends through such a tank, the stringer 370 may be fillet-sealed (not shown) to guard against leakage between the stringer 370 and the wing surface material 360, then along the shank of the fastener 320 to the wing surface 230.

At an opposite end of the fastener 320 from the inside end 380, an outside, broadened head 390 of the fastener 320 engages the bushing 330 to hold the bushing 330 and, thus, the interlocking fitting 315 in place. In the embodiment shown, the angled channel 290 of the core pocket 280 engages the interlocking fitting 315, which in turn is secured to the wing surface 230 by the fastener 320.

From FIG. 3A, other aspects of the embodiment of the invention shown will be appreciated. First, it will be appreciated that the attach anchor 220 may be formed in other ways. For one example, the interlocking fitting 315 could be shaped to directly receive the fastener 220 without using a bushing 330. Second, it will be appreciated that the angled channel 290 is suitably formed into the material of the fairing panel 210. Alternatively, the angled channel 290 is suitably composed of a separately formed material that is bonded or otherwise fastened to the fairing panel 210. Also, it will be appreciated that the interlocking fitting 315 or other head of the attach anchor 220 in one presently preferred embodiment closely fits sides of the angled channel 290. This provides a secure coupling of the fairing panel to the wing surface 230. At the same time, however, sufficient clearance between the interlocking fitting 315 other head of the attach anchor 220 and the inward-facing sides of the angled channel is desired so that the attach anchor 220 and the angled channel 290 do not become jig-locked while the fairing panel 210 is being installed on the wing surface 230. Also, it will be appreciated that the attach anchors 220 suitably have a round head or a rectangular head as desired, as long as the head shape chosen fits the shape of the angled channel 290 with which the attach anchor will engage.

FIG. 3B is a cross-sectional view of the attach anchor 220 and the angled channel 290 from a ninety-degree perpendicular angle to that shown in FIG. 3A in which the attach anchor 220 has not yet been received into the angled channel 290. Therefore, FIG. 3B shows how the fairing panel 210 can be applied to the wing surface 230 so that the fairing panel 210 can be fastened to the wing surface 230 using the attach anchor 220 and the core pocket 280.

As previously mentioned, in one presently preferred embodiment of the invention installation involves sliding the fairing panel 210 across the wing surface 230 to permit the fairing panel 210 to engage the attach anchors 220 with the angled channel 290. In such an embodiment, the core pockets 280 include a receiving aperture 394 which can receive the interlocking fitting 315 or other head of the attach anchor 220 from a direction perpendicular to the wing surface 230 and the angled channel 290. As will be appreciated with comparison to FIG. 3A, once the attach anchor 220 is received in the angled channel 290, the angled channel 290 holds the fairing panel 210 in place on the wing surface 230. This prevents the fairing panel 210 from being lifted away from the wing surface 230. However, to apply the fairing panel 210 to the wing surface 230 before it is secured, the fairing panel 210 incorporates the receiving aperture 394 to receive the attach anchor 220.

The receiving aperture 394 of the core pocket 280 is suitably an enlarged opening in the angled channel 290 itself. Alternatively, as shown in FIG. 3B, the receiving aperture 394 represents a space past an end of the angled channel 290. Taking advantage of the receiving aperture 394, the fairing panel 210 can be placed with the receiving apertures 394 of its core pockets 280 over the attach anchors 220 and pressed against the wing surface 230. Then, the fairing panel can be slid into place as shown to secure the fairing panel 210 to the wing surface 230.

Once the fairing panel 210 is anchored to the wing surface 230 as shown in FIGS. 3A and 3C, the fairing panel 210 can be locked into place so that the fairing panel 210 cannot be disengaged from the wing surface by sliding it in an opposite direction. FIG. 3C shows the attach anchor 220 and the angled channel 290 from the same perspective as FIG. 3B, but this time showing the attach anchor 220 received in the angled channel 290. Once received in the angled channel 290, the fairing panel 210 can be locked into place by a locking fastener 396. The locking fastener 396 passes through a solid area 397 of the fairing panel 210. In one presently preferred embodiment of the invention, the locking fastener 396 is received by a locking orifice 398 in the interlocking fitting 315 or other head of the attach anchor 220. Alternatively, the locking fastener 396 is suitably received in an orifice in the wing surface 230. For example, the attach anchor 220 is suitably received in an orifice 350 in the embodiment shown. The locking fastener 396 suitably is one of a screw, setscrew, bolt, rivet, stop fastener, or other similar fastener. Once the locking fastener 396 engages the locking orifice 398, advantageously the fairing panel 210 cannot be slid back over the wing surface 230 in a direction from which it was installed to remove it from the wing surface 230.

Figure 4:
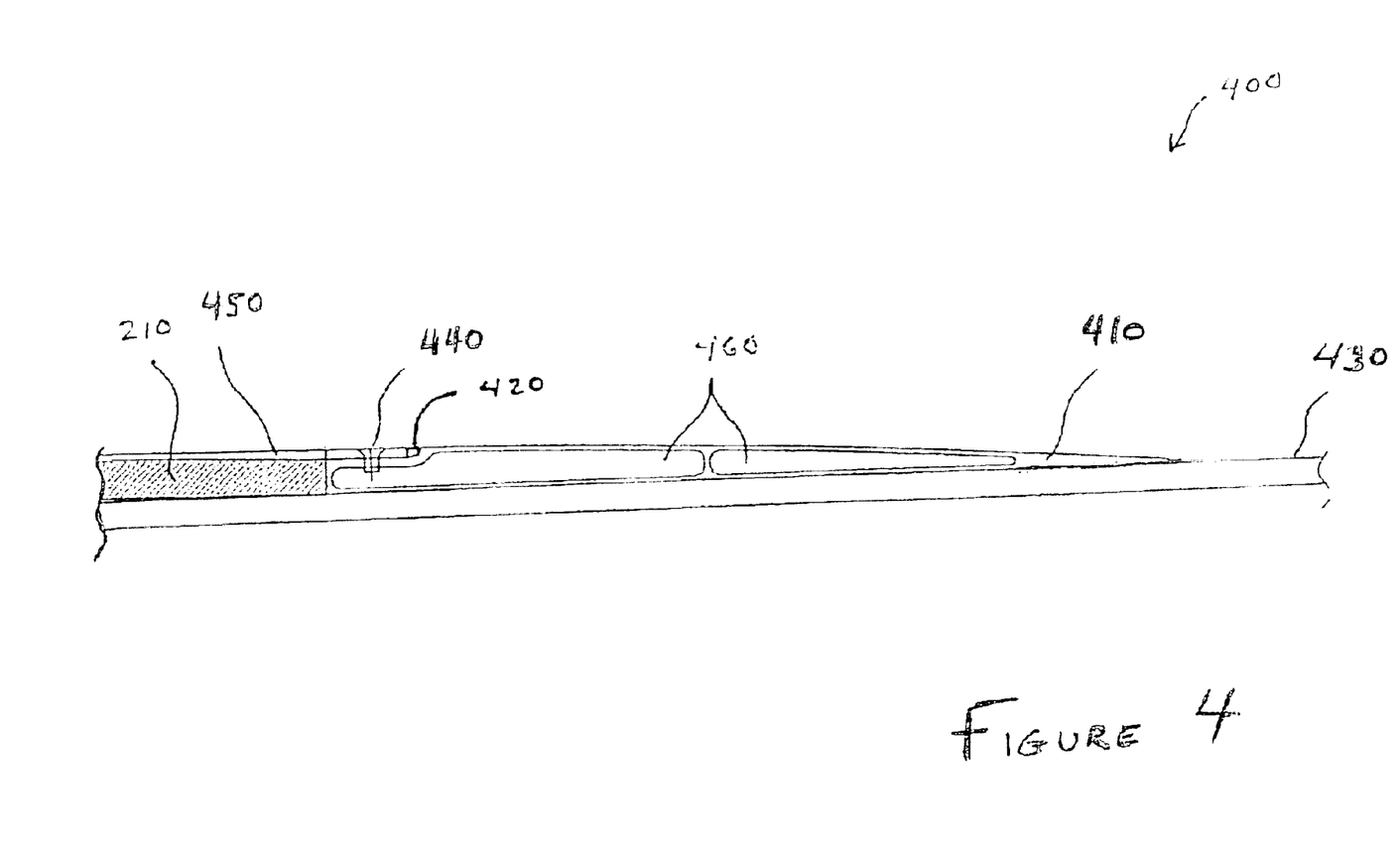
FIG. 4 is a cross sectional view of a fairing panel mounted on a wing surface and fitting with a transitioning member.

FIG. 4 shows a cross-sectional view of a portion of a wing 400 equipped with a fairing panel 210 which is fitted with a transitioning member 410. The transitioning member 410 smoothes an edge 420 of the fairing panel to the wing surface 430. Without the transitioning member 410 in place, a blunt edge would exist at the edge 420 of the fairing panel 210 which would create drag. Also, the transitioning member 410 acts to prevent fluids, such as water or air, from entering under the fairing panel 210.

More specifically, FIG. 4 shows how the transitioning member 410 is joined to the fairing panel 210 and wing surface 430. The transitioning member 410 extends from the edge 420 of the fairing panel 210 where it is joined to the fairing panel 210 with a transitioning member fastener 440. The fastener 440 suitably is a screw, rivet, or other attachment device to forcibly join the transitioning member 410 to the fairing panel 210. More specifically, the fastener 440 engages the transitioning member by passing through a fairing panel surface 450 and into the transitioning member 410. As shown, the fairing panel has a square edged core with fairing panel surface 450 having a cantilevered extended junction which engages the transitioning member 410. At an end of the transitioning member 410 opposite the fairing panel 210, the transitioning member 410 tapers to become flush with the wing surface 430 where it can be joined to the wing surface 430 with suitable adhesive. In one presently preferred embodiment, the transitioning member 410 is an extruded part composed of a flexible material. Flexibility of the material facilitates installation and allows the transitioning member 410 to be resilient to damage if weight is placed on the transitioning member 410 or its surface incurs some sort of impact. The transitioning member 410 shown is extruded to incorporate hollow cavities 460 which also allow the transitioning member 410 to have a reduced mass so as not to add unnecessary weight to the wing 400 to which it is mounted. It will be appreciated that the transitioning member 410 can be composed of an inexpensive material such that, if the transitioning member 410 and/or the fairing panel 210 had to be removed from the wing surface, it could be inexpensively replaced with a new one.

Figure 5:
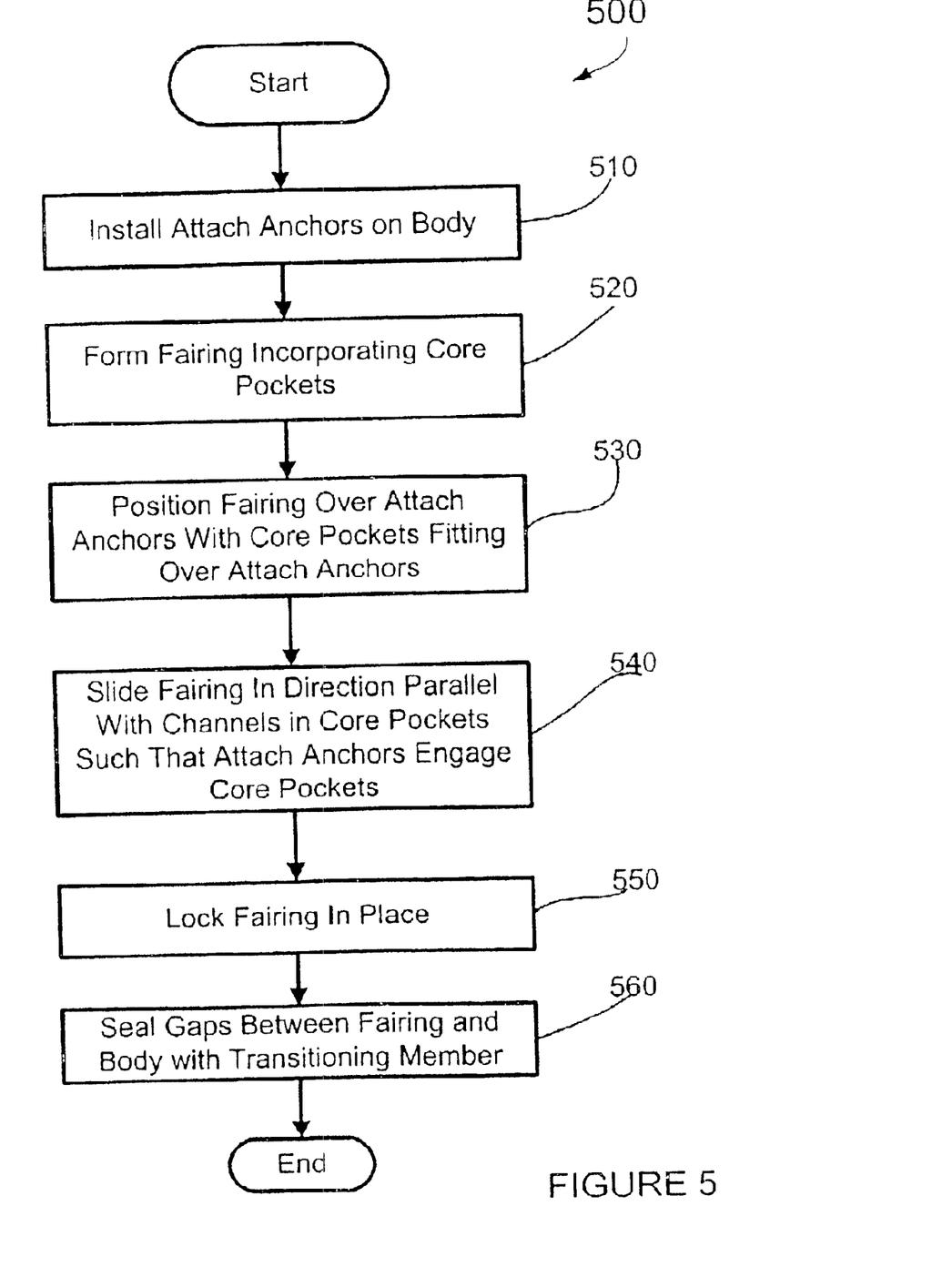
FIG. 5 is a flowchart of a method of the present invention.

FIG. 5 is a flowchart of an exemplary method 500 of attaching fairing panels to a body, such as, without limitation, a wing surface 230 (FIGS. 2A and 2B). At a block 510, the attach anchors are installed on the wing or body to which the fairing is to be mounted. At a block 520, the fairing panel is fabricated with core pockets are formed to accommodate and engage the attach anchors. It will be appreciated that the order of these steps could be made in another order as desired for a particular application. At a block 530, the fairing panel is positioned with the core pockets over the attach anchors to receive the attach anchors within the body of the fairing panel. Once in place, at a block 540 the fairing panel is slid across the surface of the body or the wing so that the attach anchors engage the core pockets to prevent the fairing from being lifted away from the body or wing. At a block 550, the fairing panel is locked in place to prevent the fairing panel from being slid back off the attach anchors. At a block 560, a transitioning member is applied adjacent the fairing panel to seal gaps around the fairing panel, or between the fairing panel and any other fairing panels. This method can be repeated for as many fairing panels as desired to be installed on the body or wing.

While the preferred embodiment of the invention has been illustrated and described in the context of attaching a fairing to an aircraft wing, embodiments of the present invention could be used to attach fairings to other bodies that could benefit from enhanced aerodynamic, fluid dynamic, or other properties that could be improved by the addition of one or more fairings. In addition, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for attaching a fairing to a body, the method comprising:
   disposing on a body a plurality of attach anchors, each of the attach anchors having a head;
   disposing in a fairing a plurality of core pockets that are alignable with the plurality of attach anchors, each of the core pockets defining a channel;
   placing the fairing against the body such that the heads of the attach anchors are received in the core pockets, wherein the attach anchors have a shaft and a rectangular head in a plane perpendicular to the shaft; and
   sliding the fairing across the body, the channels sliding along the heads of the attach anchors such that the fairing is prevented from being lifted away from the body.

2. The method of claim 1, wherein the head of each of the plurality of attach anchors is located at a distal end from the body and each of the plurality of attach anchors also has a shaft located at an end nearer the body than the head, the head having a first width greater than a second width of the shaft.

3. The method of claim 2, wherein the head of each of the attach anchors includes an interlocking fitting and the shaft includes a cylindrical fastener passing through the interlocking fitting.

4. The method of claim 3, wherein the interlocking fitting includes an eccentric opening or the cylindrical fastener is received by a bushing having an undersized diameter relative to an opening in the interlocking fitting to be engaged by the bushing for receiving the cylindrical fastener such that the interlocking fitting can be slidably moved relative to the cylindrical fastener for aligning the interlocking fitting.

5. The method of claim 1, wherein the plurality of core pockets defines an inner channel having a channel width arranged to accommodate a first width of the head, the plurality of core pockets being covered by a slotted cover having a receiving aperture wide enough for the first width of the head to pass through and narrowing to a securing groove through which the first width of the head cannot pass through.

6. The method of claim 5, wherein the head has a first cross-section in a plane parallel with the shaft, the first cross-section being shaped to circumscribe a second cross-section of the inner channel.

7. The method of claim 1, wherein the attach anchors are mounted in existing orifices on the body.

8. The method of claim 1, further comprising securing the fairing to the body by inserting at least one locking fastener through the fairing and engaging the body.

9. The method of claim 8, wherein the locking fastener engages with an orifice in the head of one of the attach anchors.

10. The method of claim 1, further comprising mating the fairing with a transitioning surface such that a gap between the fairing and the body is covered.

11. The method of claim 10, further comprising affixing the transitioning surface to both the fairing and the body.

12. A method for attaching a fairing to an aircraft wing, the method comprising:
   shaping a fairing, the fairing having a wing-facing surface contoured to follow the shape of the aircraft wing and a wing-opposed surface contoured differently than the shape of the aircraft wing;
   disposing on the aircraft wing a plurality of attach anchors, each of the attach anchors having a head;
   disposing in a fairing a plurality of core pockets that are alignable with the plurality of attach anchors, each of the core pockets defining a channel;
   placing the fairing against the aircraft wing such that the heads of the attach anchors are received in the core pockets; and
   sliding the fairing across the aircraft wing, the channels sliding along the heads of the attach anchors such that the faking is prevented from being lifted away from the aircraft wing.

13. The method of claim 12, wherein the attach anchors have a shaft and a round head in a plane perpendicular to the shaft.

14. The method of claim 12, wherein the attach anchors have a shaft and a rectangular head in a plane perpendicular to the shaft.

15. The method of claim 12, wherein the head of each of the plurality of attach anchors is located at a distal end from the aircraft wing and each of the plurality of attach anchors also has a shaft at an end nearer the aircraft wing than the head, the head having a first width greater than a second width of the shaft.

16. The method of claim 15, wherein the head of each of the attach anchors includes an interlocking fitting and the shaft includes a cylindrical fastener passing through the interlocking fitting.

17. The method of claim 16, wherein the interlocking fitting includes an eccentric opening or the cylindrical fastener is received by a bushing having an undersized diameter relative to an opening in the interlocking fitting to be engaged by the bushing for receiving the cylindrical fastener such that the interlocking fitting can be slidably moved relative to the cylindrical fastener for aligning the interlocking fitting.

18. The method of claim 12, wherein the plurality of core pockets defines an inner channel having a channel width arranged to accommodate a first width of the head, the plurality of core pockets being covered by a slotted cover having a receiving aperture wide enough for the first width of the head to pass through and narrowing to a securing groove through which the first width of the head cannot pass through.

19. The method of claim 18, wherein the head has a first cross-section in a plane parallel with the shaft, the first cross-section being shaped to circumscribe a second cross-section of the inner channel.

20. The method of claim 12, wherein the attach anchors are mounted in existing orifices on the aircraft wing.

21. The method of claim 12, further comprising securing the fairing to the aircraft wing by inserting at least one locking fastener through the fairing and engaging the aircraft wing.

22. The method of claim 21, wherein the locking fastener engages with an orifice in the head of one of the attach anchors.

23. The method of claim 12, further comprising mating the fairing with a transitioning surface such that a gap between the fairing and the aircraft wing is covered.

24. The method of claim 23, further comprising affixing the transitioning surface to both the fairing and the aircraft wing.

25. The method of claim 12, wherein the attach anchors are mounted to stringers passing through the aircraft wing.

26. The method of claim 12, wherein the attach anchors have self-sealing collars such that the attach anchors can be mounted through a tank in the aircraft wing.

27. A system for attaching a fairing to a body, the system comprising:
a plurality of attach anchors disposed on a body, each of the attach anchors having a head, wherein the attach anchors have a shaft and a rectangular head in a plane perpendicular to the shaft; and
a fairing including a plurality of core pockets that are alignable with the plurality of attach anchors, each of the core pockets defining a channel, the fairing being positioned against the body such that the heads of the attach anchors are received in the receiving apertures of the core pockets, the fairing being slid across the body and the channels sliding along the heads of the attach anchors such that the fairing is prevented from being lifted away from the body.

28. The system of claim 27, wherein the head of each of the plurality of attach anchors is located at a distal end from the body and each of the plurality of attach anchors also has a shaft at an end nearer the body than the head, the head having a first width greater than a second width of the shaft.

29. The system of claim 28, wherein the head of each of the attach anchors includes an interlocking fitting and the shaft includes a cylindrical fastener passing through the interlocking fitting.

30. The system of claim 29, wherein the interlocking fitting includes an eccentric opening or the cylindrical fastener is received by a bushing having an undersized diameter relative to an opening in the interlocking fitting to be engaged by the bushing for receiving the cylindrical fastener such that the interlocking fitting can be slidably moved relative to the cylindrical fastener for aligning the interlocking fitting.

31. The system of claim 27, wherein the plurality of core pockets defines an inner channel having a channel width arranged to accommodate a first width of the head, the plurality of core pockets being covered by a slotted cover having a receiving aperture wide enough for the first width of the head to pass through and narrowing to a securing groove through which the first width of the head cannot pass through.

32. The system of claim 31, wherein the head has a first cross-section in a plane parallel with the shaft, the first cross-section being shaped to circumscribe a second cross-section of the inner channel.

33. The system of claim 27, wherein the attach anchors are mounted in existing orifices on the body.

34. The system of claim 27, further comprising securing the fairing to the body by inserting at least one locking fastener through the fairing and engaging the body.

35. The system of claim 34, wherein the locking fastener engages with an orifice in the head of one of the attach anchors.

36. The system of claim 27, further comprising mating the fairing with a transitioning surface such that a gap between the fairing and the body is covered.

37. The system of claim 36, further comprising affixing the transitioning surface to both the fairing and the body.

38. An apparatus for attaching a fairing to an aircraft wing, the apparatus comprising:
a plurality of attach anchors disposed on a body, each of the attach anchors having a head; and
a fairing including a plurality of core pockets that are alignable with the plurality of attach anchors, each of the core pockets defining a channel, the fairing being positioned against the aircraft wing such that the heads of the attach anchors are received in the receiving apertures of the core pockets, the fairing being across the aircraft wing, the channels sliding along the heads of the attach anchors such that the fairing is prevented from being lifted away from the aircraft wing.

39. The apparatus of claim 38, wherein the attach anchors have a shaft and a round head in a plane perpendicular to the shaft.

40. The apparatus of claim 38, wherein the attach anchors have a rectangular head in a plane perpendicular to the shaft.

41. The apparatus of claim 38, wherein the head of each of the plurality of attach anchors is located at a distal end from the aircraft wing and each of the plurality of attach anchors also has a shaft at an end nearer the aircraft wing than the head, the head having a first width greater than a second width of the shaft.

42. The apparatus of claim 41, wherein the head of each of the attach anchors includes an interlocking fitting and the shaft includes a cylindrical fastener passing through the interlocking fitting.

43. The apparatus of claim 42, wherein the interlocking fitting includes an eccentric opening or the cylindrical fastener is received by a bushing having an undersized diameter relative to an opening in the interlocking fitting to be engaged by the bushing for receiving the cylindrical fastener such that the interlocking fitting can be slidably moved relative to the cylindrical fastener for aligning the interlocking fitting.

44. The apparatus of claim 38, wherein the plurality of core pockets defines an inner channel having a channel width arranged to accommodate a first width of the head, the plurality of core pockets being covered by a slotted cover having a receiving aperture wide enough for the first width of the head to pass through and narrowing to a securing groove through which the first width of the head cannot pass through.

45. The apparatus of claim 44, wherein the head has a first cross-section in a plane parallel with the shaft, the first cross-section being shaped to circumscribe a second cross-section of the inner channel.

46. The apparatus of claim 38, wherein the attach anchors are mounted in existing orifices on the aircraft wing.

47. The apparatus of claim 38, further comprising securing the fairing to the aircraft wing by inserting at least one locking fastener through the fairing and engaging the aircraft wing.

48. The apparatus of claim 47, wherein the locking fastener engages with an orifice in the head of one of the attach anchors.

49. The apparatus of claim 38, further comprising mating the fairing with a transitioning surface such that a gap between the fairing and the aircraft wing is covered.

50. The apparatus of claim 49, further comprising affixing the transitioning surface to both the fairing and the aircraft wing.

* * * * *